United States Patent [19]
Schmitt

[11] 3,972,726
[45] Aug. 3, 1976

[54] PROCESS FOR MANUFACTURING A NEGATIVE ACCUMULATOR ELECTRODE FOR THE REVERSIBLE STORAGE AND RESTITUTION OF HYDROGEN

[75] Inventor: Reimar Schmitt, Chene-Bourgeries, Geneva, Switzerland

[73] Assignee: Battelle Memorial Institute, Switzerland

[22] Filed: Oct. 17, 1974

[21] Appl. No.: 515,617

[30] Foreign Application Priority Data
Oct. 18, 1973 Switzerland.................... 14762/73

[52] U.S. Cl.................................... 136/20; 136/23; 136/29; 136/76; 136/86 D
[51] Int. Cl.²........................................ H01M 4/36
[58] Field of Search ................ 136/23, 76, 120, 28, 136/29, 86 D, 20; 427/123, 216, 217; 75/200, 211, 212, 214, 226, .5 A, .5 B

[56] References Cited
UNITED STATES PATENTS

| | | |
|---|---|---|
| 2,683,182 | 7/1954 | Salanze................................ 136/23 |
| 3,202,537 | 8/1965 | Norman et al.................. 427/217 X |
| 3,287,164 | 11/1966 | Arrance........................... 136/23 X |
| 3,413,711 | 12/1968 | Brewer et al. .................. 427/123 X |
| 3,476,530 | 11/1969 | Ehrreich et al................. 427/216 X |
| 3,549,412 | 12/1970 | Frey, Jr. et al. ..................... 427/217 |
| 3,669,745 | 6/1972 | Beccu.................................... 136/20 |
| 3,824,131 | 7/1974 | Beccu.......................... 136/120 R X |

Primary Examiner—John H. Mack
Assistant Examiner—C. F. LeFevour
Attorney, Agent, or Firm—Robert E. Burns; Emmanuel J. Lobato; Bruce L. Adams

[57] ABSTRACT

A process is described for the manufacture of negative accumulator electrodes having a current conducting carrier skeleton and an active material for the reversible electrochemical storage and restitution of hydrogen on charging and discharging. The powder particles of the active material are at least partially enveloped and coated with a hydrogen-permeable copper layer and the copper-coated active material particles are processed by heating to sintering temperatures with simultaneous application of pressure to form a porous, mechanically-stable electrode permeated with a sintered copper carrier skeleton of sintered copper coated on the active material particles.

6 Claims, 2 Drawing Figures

PROCESS FOR MANUFACTURING A NEGATIVE ACCUMULATOR ELECTRODE FOR THE REVERSIBLE STORAGE AND RESTITUTION OF HYDROGEN

Negative electrodes for alkaline storage cells (storage batteries, accumulators) are known, wherein hydrides of titanium-nickel alloys serve as active material. During the charging process, the hydrogen developed at the solids/liquid phase boundary due to cathodic loading of such an electrode is incorporated into the interstitial positions of the Ti-Ni-alloy. The hydrogen interstitially stored in this manner is, on the electrode being anodically loaded, given off once again and electrochemically converted to water.

An important advantage of such electrodes consists in the extremely high energy storage capacity due to the fact that they are able to electrochemically take up or once again give up hydrogen in large quantities and in reversible manner.

The especially advantageous interstitial hydrogen take-up in the interstitial positions of the titanium-nickel alloys involves, however, a substantial degree of lattice expansion during the charging process, which said lattice expansion is reversed, accompanied by hydrogen evolution, during the discharging process. The mechanical stressing of the electrode due to the repeated changes in volume during the charging/discharging cycles thus requires that a high degree of mechanical strength of the electrode should be guaranteed, in order that a satisfactory service life may be achieved.

According to a known proposal, account is taken of this problem of mechanical stressing inter alia in that the electrodes are manufactured from a powder mixture in which there is added to the active material a copper powder acting as binder or carrier metal. At the present time, there are employed for example powder mixtures containing 70% by weight of active material and 30% by weight of copper. Furthermore, for enhanced current discharge in the electrode and also for improving the mechanical strength thereof, a carrier skeleton in the form of a copper gauze is embedded in the electrode plate.

In this case, the total copper content of the electrode is approximately 50% by weight.

For enhancing the specific storage capacity of such electrodes, therefore, it would be necessary to reduce the proportion of copper in the electrode, but without thereby impairing the mechanical stability and the long-period behaviour thereof. However, this requires the simultaneous satisfaction of contradictory requirements, since of course the copper serves precisely for guaranteeing the mechanical stability of the electrode.

It is the object of the present invention to take account to a considerable degree of the above-discussed problems and to make it possible to manufacture electrodes having a long service life and also a high energy storage capacity.

For this purpose, the invention relates to a process for the manufacture of a negative storage cell or storage battery (accumulator) electrode having a current-conductive carrier skeleton and also an electrochemically active material for reversible storage and restitution (or return) of hydrogen due to electrochemical charging and discharging. This process is, according to the invention, characterised in that powder particles of the active material are so coated with copper that each active material particle is, whilst maintaining its electrochemical activity, for the taking-up and giving-up of hydrogen, at least partially enveloped in copper, and in that the enveloped active material particles are, due to heating with simultaneous application of pressure, processed to a porous, mechanically stable electrode body permeated with a copper sintered carrier skeleton formed by sintering the copper envelope of the active material particles.

From such coating of the active material particles with copper, according to the invention important advantages are derived. This previous coating with copper affords, in fact, during manufacture of the electrodes by hot pressing, a guarantee of extremely uniform distribution of the copper and thereby of the formation of a sintered copper matrix which coheres strongly but is nevertheless relatively light, throughout the entire electrode body. The copper serving as a bonding metal is thereby utilised in optimum fashion in order to guarantee a high degree of mechanical strength and also a high degree of transverse conductivity in the electrode. Furthermore, it is possible thereby to achieve especially effective utilisation of the active material since experience shows that, due to expedient selection of the manufacturing conditions in respect of the applied copper layer, this layer can be made hydrogen-permeable, whereby practically unhindered electro-chemical activity of the electrode can be guaranteed.

The coating provided in accordance with the invention of the active material powder with a hydrogen-permeable copper layer may advantageously be effected by reducing a dissolved copper salt at the particle surface. For this purpose, the powder may be introduced into a copper salt solution, with simultaneous addition of an organic reduction agent (for example an aldehydo). Thereby, there takes place a reduction reaction in which the particle surface operates as catalyst, the copper being chemically deposited on this surface to form a copper layer.

The production of a copper layer which is highly permeable for hydrogen can be guaranteed by appropriately adjusting the precipitation parameters, the concentration and temperature of the copper salt solution and also previous activation of the particle surface influencing the properties of the layer.

Furthermore, for the chemical reduction of the copper salt solution, the hydride hydrogen of the active material powder may itself be employed as reduction agent. If, for example, an active material powder having the composition TiNiH is contacted with an aqueous copper salt solution, the desorbing hydride hydrogen at the particle surface reduces the copper ions to metallic copper in accordance with the equation:

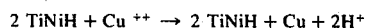

$$2\,\text{TiNiH} + \text{Cu}^{++} \rightarrow 2\,\text{TiNiH} + \text{Cu} + 2\text{H}^+$$

The desorption rate and therewith the precipitation can be influenced via the temperature and also the copper concentration in the solution.

Possible would also be electro-chemical reduction of the copper salt, the active material powder to be coated being suspended in a copper salt solution and repeatedly contacted, for a short time, with a stationary cathode of a current-fed galvanic cell. During this contact, the powder particle is at the same potential as the stationary cathode, so that an electro-chemical reduction can be achieved, accompanied by precipitation of copper on the particle surface. When the powder particle leaves the stationary cathode, this reduction is interrupted. Thereby, by interrupting the contact, it is possible to achieve concentration equalisation at the particle/electrolyte phase boundary face between two successive contacts, whereby polarisation during the electro-chemical coating can, to a considerable extent, be avoided. Thus, such cathodic reduction, for example employing a so-called fluidised-bed electrode, permits the production of a uniform layer on the entire particle surface. Thereby, the thickness of the layer and also its porosity can be determined by adjusting the precipitation parameters of current density and time. With low current densities, uniform layers of low porosity are obtained. On the other hand, high current densities normally result in the formation of non-uniform, highly porous layers.

The invention is discussed hereinbelow with reference to examples and to service-life tests, the results of which are shown in the accompanying drawings, in which.

EXAMPLE 1

Figure 1:
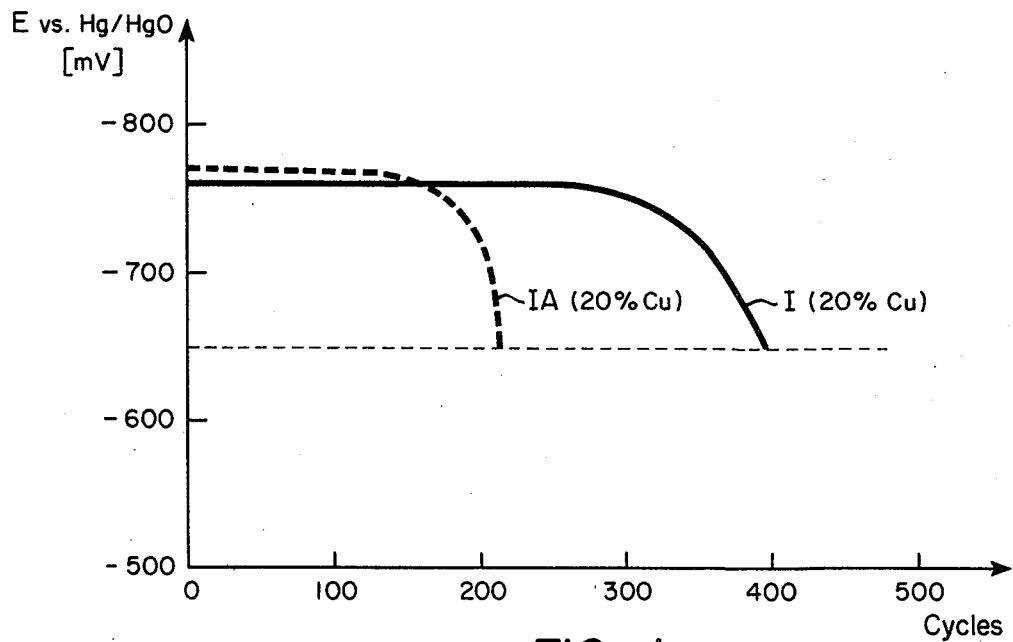
FIG. 1 shows two test curves I, IA, in which the service life is represented by the profile of the electrode potential on termination of discharge, as a function of the number of charging and discharging cycles, the curve I applying to round test electrodes manufactured in accordance with the invention and the curve IA to similar comparison electrodes manufactured in per se known manner.

As starting material for the manufacture of negative accumulator electrodes in the form of porous, circular or rectangular discs, there is employed an active material powder consisting of a titanium-nickel hydride, in which titanium and nickel are alloyed with each other in a weight ratio of approximately 1:1, the grain size of the powder being less than 33 $\mu$.

Manufacture of the electrodes is effected in the following manner.

A. Coating of the active material

The active material powder is chemically coated with copper. The particle surface is, first of all, activated by the formation of palladium nuclei. For this purpose, first a pre-treatment of the powder with an $SnCl_2$ solution (50 g/l $SnCl_2$; 50 g/l HCl 30%) is effected at room temperature during thirty minutes, employing 100 g of powder per 200 cc of solution. The processed powder is then washed with distilled water until neutral reaction is achieved, subsequently agitated during 20 minutes at room temperature in a $PdCl_2$ solution (0.5 g/l $PdCl_2$; 10 g/l HCl 30%) and, finally, washed again to neutral reaction.

For the chemical coating with copper of the powder thus activated, a bath of a solution having the following composition is employed: $CuSO_4 \cdot 5H_2O$ : 10 g/l (corresponding to 2.5g Cu/l) $KNaC_4H_4O_6$ : 40 g/l KOH : 10 g/l Paraformaldehyde : 12 g/l the solution having a pH value of 10 - 12.

Coating is effected at room temperature accompanied by vigorous agitation of the said bath with the pre-treated active material powder suspended therein. Thereby, there occurs a chemical reaction which is completed after two hours and affords the desired coating due to conversion of the copper salt to copper at the particle surface of the powder. The active material powder thus chemically coated with copper is, finally, washed and dried under argon-hydrogen, being thereby ready for electrode manufacture.

B. Manufacture of the electrode body

The copper-coated active material powder is first of all cold pre-pressed and then processed, by hot-pressing under a protective gas atmosphere, to a porous electrode body having the desired shape and size, the copper layer affording a cohering sintered support.

Hereinbelow, the manufacturing conditions and other data for an electrode series obtained in the above-described manner are reproduced:

Series I: round electrodes
Manufacturing conditions:
| | |
|---|---|
| Hot pressing pressure: | 8 t/cm² |
| Temperature: | 400°C |
| Pressing duration: | 3 minutes |
| Protective gas: | A/H₂ - 93/7 |

Electrode data
| | |
|---|---|
| Active material: | 1 to 1.1 g |
| Proportion of the Cu sintered support, Series I: | 20% by weight |
| Current-discharge means: | two Cu wires (0.22 mm $\phi$, total 0.1g) |
| Dimensions: | Diameter 22 mm Thickness 0.98 – 1 mm |

Formation of the active material:
| | |
|---|---|
| Half-cell arrangement: | with two Ni counter-electrodes in sandwich arrangement |
| Electrolyte: | 4 N KOH |
| Temperature | 25°C |
| Formation: | successive increase of the quantity of current charged-in during 5 charging-discharging cycles |
| Loading during the formation cycles: | 25 mA/g active material (C/10) |
| Cut-off potential: | −700 mV relative to Hg/HgO |

Service life testing:
| | |
|---|---|
| Half-cell arrangement: | Test electrode in sandwich arrangement with two Ni lattice (or grid) counter electrodes |
| Electrolyte: | 4 N KOH |
| Test temperature: | 25°C |
| Loading during charging and | |

-continued

| | |
|---|---|
| discharging | 50 mA/g active material (C/5) |
| Discharge depth: | 70% of the C/5 capacity |
| Charging factor: | 1.15 |
| Measurement of the electrode Potential E under load, in each instance at the end of the discharge phase, as a function of the cycle number (see FIG. 1) | |
| Test end: | when cut-off potential - 650 mV relative to Hg/HgO |

Series II 2nd III - Rectangular electrodes
Manufacturing conditions:

| | |
|---|---|
| Hot pressing pressure | 1 t/cm² |
| Temperature: | 550°C |
| Pressing duration: | 10 min. |
| Protective gas: | A/H₂ - 93/7 |
| Electrode data: | |
| Active material: | 7 - 8 g |
| Proportion of the Cu-sintered support | |
| Series II: | 20% by weight Cu |
| Series III: | 10% by weight Cu |
| Cu lattice (or grid) support: | 1.1 to 1.2 g |
| Dimensions: | 42 × 64 × 1 mm |
| Forming and service life testing: | |

These are effected as indicated hereinabove for Series I.

For comparison purposes, further electrode series (designated hereinbelow IA or IIA, IIIA) were manufactured. For these comparison series IA, IIA, IIIA, the same above-indicated hot pressing conditions and also electrode dimensions as in series I to III are employed. On the other hand, the electrode bodies are hot-pressed from mixtures of active material powder with lamellar copper powder (having the trade mark ECKA 7200 MP and having average particle dimensions of 0.1 × 50 μ), so as to permit of a comparison of the electrode service life with the electrodes, manufactured in accordance with the invention from copper-coated active material powder, of the corresponding Series I or II, III.

Figure 2:
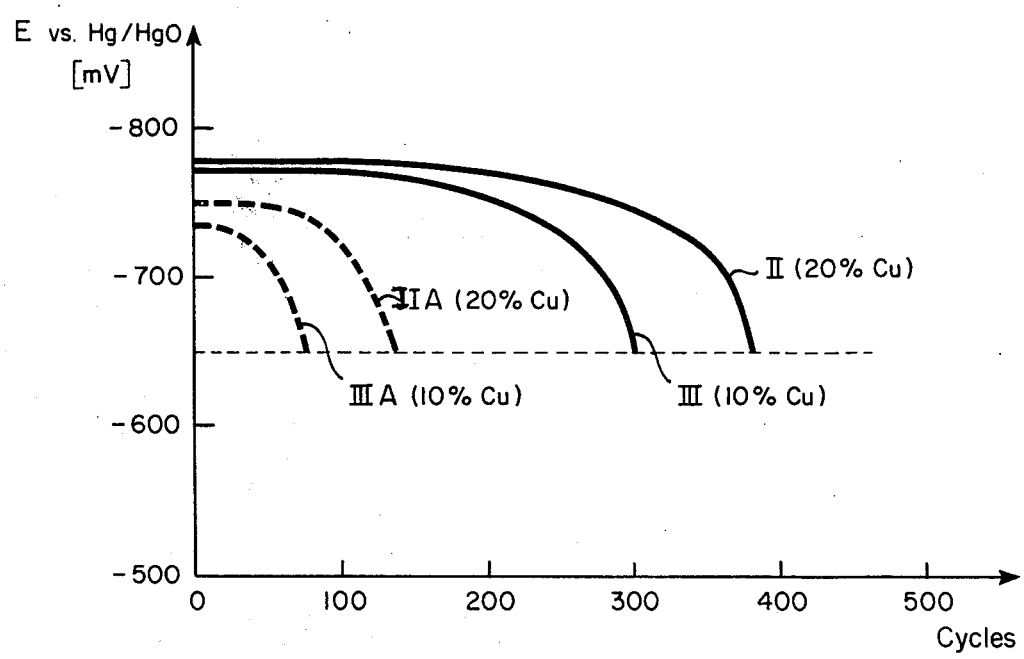
FIG. 2 shows four test curves II representing the service life as in FIG. 1, although, in this case, the curves II, III or IIA, IIIA apply to rectangular test electrodes or comparison electrodes.

The curves of FIGS. 1 and 2 show the effective service life (cycle No.) of the electrode Series I, IA or II, IIA, III, IIIA, until the electrode potential E attains a value of approximately −650mV relative to Hg/HgO.

EXAMPLE 2

The active material powder described in Example 1 is employed in the following manner as starting material for the manufacture of negative accumulator electrodes:

A. Coating of the active material

The active material powder is chemically coated with copper, a copper salt being converted to copper at the powder particle surface by the hydrogen contained in the active material.

For this purpose, the active material powder is processed in a CuSO₄ solution (54 g CuSO₄/l; 16 ml HBF₄/l), for 10 hours, employing 40 g of powder per litre of solution and accompanied by vigorous agitation, the temperature of the solution being held at 95° C during the first two hours and, thereupon, lowered to 70° C.

During this treatment, the desired coating is achieved in that the copper salt is converted to copper due to the hydrogen desorbing out of the active material at increased temperature of the solution, at the particle surface.

The powder coated with copper is separated-off by filtering, is washed first of all with distilled water and then with alcohol and, finally, is dried under argon-hydrogen.

The copper-coated active material powder thus obtained is, before manufacture of the electrode body, charged with hydrogen. This is achieved by first of all heating the coated powder under vacuum in a furnace or oven to 100°C, then processing it during 1 hour at 250°C under a hydrogen atmosphere and under a pressure of 1 atmosphere and, finally, leaving it to cool to room temperature, under hydrogen.

B. Manufacture of electrode body

The electrode bodies are, finally, manufactured by hot-pressing as described in example 1.

The forming and service life testing is, finally, effected again as in Example 1 and affords four electrode series the service lives of which correspond to those of Series I to III in Example 1.

From the test results shown in FIGS. 1 and 2 there will be ascertained various advantages achieved due to the coating provided in accordance with the invention of the active material particles, for the purpose of forming a sintered carrier skeleton by hot-pressing.

Thus, for example, curve I shows that chemical coating with only 20% by weight of Cu already affords a useful service life (up to −650 mV) of approximately 400 cycles. In contradistinction thereto, only approximately half of this service life is achieved in the case of the corresponding comparison electrodes of Series IA which are manufactured under the same hot-pressing conditions from a powder mixture containing 20% by weight of lamellar powder and 80% by weight of active material.

The said copper content of 20% by weight is relatively small, so that the electrodes consist predominantly of the electro-chemically active material and are, nevertheless, able to achieve long useful service lives. In contradistinction thereto, the corresponding comparison electrodes of Series IA, have, also with 20% by weight Cu, a service life of only 200 cycles, as compared with 400 cycles for Series I.

As already stated, the curves of FIG. 2 show the corresponding test results for rectangular electrodes provided with a central copper lattice (or grid) amounting to approximately 10% by weight of the electrode weight. In the case of such, substantially larger electrodes, there is already achieved for the electrode of Series III (having approximately 20% by weight Cu as a whole) a useful service life of 300 cycles. Relative thereto, the corresponding comparison electrodes of Series IIIA give an entirely unsatisfactory service life of approximately 70 cycles. Furthermore, the electrodes of Series II (having a total of approximately 30% Cu) are found to have a service life of 380 cycles; this in comparison with the entirely unsatisfactory service life of only 130 cycles in the case of the comparison electrodes of Series IIA.

Thus, these test results show that the electrodes manufactured in accordance with the invention permit of a substantial reduction of the total copper content of the electrodes, whilst guaranteeing a long useful service life.

It is self-evident that not only TiNi but also various other alloying phases such as for example $Ti_2Ni$ and in particular binary phase mixtures of these two phases may be employed as active material, in order to achieve the above-discussed advantages of the invention.

I claim:
1. A process for manufacturing negative accumulator electrodes having a consolidated porous electrode body with a current-conducting copper matrix and with an active material providing reversible storage and restitution of hydrogen due to electrochemical charging and discharging in an alkaline storage cell, said process comprising the steps of:
   a. coating a particulate mass of said active material with copper, by reduction of a copper salt in solution at the surface of the particles of said mass, in such a manner as to deposit on said particles surface a copper coating which is permeable to hydrogen; and
   b. sintering together the copper coatings on the resulting coated particles of said active material, by subjecting said mass of coated particles to hot-pressing in such a manner as to consolidate said porous electrode body by means of a copper matrix formed by sintering said copper coatings.

2. The process according to claim 1, wherein a reducing agent is added to said solution in order to reduce said copper salt at the surface of said particles.

3. The process according to claim 1, wherein said solution is heated so as to reduce said copper salt by means of hydrogen desorbed from said active material.

4. The process of claim 1, wherein said copper salt is reduced by electrochemical reduction in a galvanic cell.

5. The process of claim 1, wherein a copper network is embedded within said mass of copper-coated particles of active material which is subjected to hot-pressing.

6. The process according to claim 4, wherein the particles of said active material are suspended in said copper salt solution and are repeatedly contacted with a cathode of said galvanic cell so as to achieve cathodic reduction of said copper salt at the particle surface.

* * * * *